United States Patent [19]

Watson

[11] 4,329,595
[45] May 11, 1982

[54] AC RESONANT CHARGER WITH CHARGE RATE UNRELATED TO PRIMARY POWER FREQUENCY

[75] Inventor: Harold Watson, Torrance, Calif.

[73] Assignee: The United States of America as represented by the United States Department of Energy, Washington, D.C.

[21] Appl. No.: 101,339

[22] Filed: Dec. 7, 1979

[51] Int. Cl.³ .......................................... H02M 7/155
[52] U.S. Cl. .................................... 307/107; 307/109; 307/151; 363/87; 363/129; 320/1
[58] Field of Search ............... 307/106, 107, 108, 109, 307/151; 363/86, 87, 126, 128, 129; 320/1

[56] References Cited

U.S. PATENT DOCUMENTS

| | | | |
|---|---|---|---|
| 3,154,695 | 10/1964 | Mac Gregor et al. | 307/213 |
| 3,541,421 | 11/1970 | Buchman | 363/86 X |
| 3,593,105 | 10/1971 | Brohaugh | 363/129 |
| 3,611,097 | 10/1971 | Joslyn | 318/318 |
| 3,772,601 | 11/1973 | Smith | 328/65 |
| 3,772,613 | 11/1973 | Smith | 328/65 X |
| 3,806,829 | 4/1974 | Duston et al. | 331/94.5 |
| 3,860,864 | 1/1975 | Fitz | 307/106 X |
| 3,896,396 | 7/1975 | Whitehouse et al. | 331/94.5 PE |
| 3,921,035 | 11/1975 | Holmes | 315/307 |
| 4,099,807 | 7/1978 | Barnes | 315/127 |

Primary Examiner—Michael L. Gellner
Assistant Examiner—James L. Dwyer
Attorney, Agent, or Firm—Clifton E. Clouse, Jr.; Roger S. Gaither; Richard G. Besha

[57] ABSTRACT

An AC resonant charger for a capacitive load, such as a PFN, is provided with a variable repetition rate unrelated to the frequency of a multi-phase AC power source by using a control unit to select and couple the phase of the power source to the resonant charger in order to charge the capacitive load with a phase that is the next to begin a half cycle. For optimum range in repetition rate and increased charging voltage, the resonant charger includes a step-up transformer and full-wave rectifier. The next phase selected may then be of either polarity, but is always selected to be of a polarity opposite the polarity of the last phase selected so that the transformer core does not saturate. Thyristors are used to select and couple the correct phase just after its zero crossover in response to a sharp pulse generated by a zero-crossover detector. The thyristor that is turned on then automatically turns off after a full half cycle of its associated phase input. A full-wave rectifier couples the secondary winding of the transformer to the load so that the load capacitance is always charged with the same polarity.

10 Claims, 4 Drawing Figures

AC RESONANT CHARGER WITH CHARGE RATE UNRELATED TO PRIMARY POWER FREQUENCY

BACKGROUND OF THE INVENTION

The invention described herein was made at AiResearch Manufacturing Company of California, a division of the Garrett Corporation, in the course of, or under, DOE Contract No. EY-77-C-04-3745 between the United States Department of Energy and The Garrett Corporation.

This invention relates to an AC resonant charger for a capacitive load, such as a pulse forming network (PFN), and more particularly to an AC resonant charger with a variable repetition rate unrelated to the primary power frequency.

AC resonance has been used to advantage to charge a PFN, but at rates which have fixed relationships to the AC power frequency. In some applications, it is necessary to generate high-energy pulses at a rate that is variable or selected within limits of the AC power frequency. For example, the requirements of a laser system may be from 0 to 50 pps. To form these pulses from a 60 Hertz power source requires control of energy into the charger circuit that is related to the phase of the power source, yet independent of its frequency.

An object of this invention is therefore to generate high-energy pulses from a multiphase AC power source at a rate that may be variable.

Another object is to generate high-energy pulses from a multiphase AC power source at a rate that may be controlled within limits of the AC power frequency without synchronization with the AC power source.

Still another object is to repeatedly charge a capacitive load with an AC resonant charger from a multiphase AC power source at a rate independent of the AC power frequency that may be controlled within limits of the AC power frequency.

Yet another object is to utilize half cycles of aternate polarity of a multiphase AC power source to repeatedly charge a capacitive load through a resonant charger and a full-wave rectifier when a transformer is used in the resonant charger.

SUMMARY OF THE INVENTION

In accordance with the present invention, each of a plurality of phases of an AC power source is coupled to an AC resonant charger by separate self-extinguishing switch means for charging a capacitive load at a rate independent of the power frequency, and with a charge of a predetermined polarity and peak voltage related to the voltage of the power source. The term self-extinguishing switch means is used in a generic sense to include silicon controlled rectifiers and analogous gate control switch elements that are triggered on and remain on until the voltage across the element reduces to a level insufficient to maintain a minimum conduction. Each switching means is adapted to be normally nonconductive, and to be turned on by a trigger pulse for conduction during half of a full-phase cycle. The resonant charger is coupled by the switching means from the time it is triggered on until the phase reaches a level near zero crossover.

A feature of the invention is that the process may be repeated at rates that may be controlled by varying a "command charge" signal rate from zero to very near the frequency of the power source, and without synchronization of the command charge signal with the power source. For selection of the proper phase in response to a command charge signal pulse, the control means includes zero-crossover detection means for monitoring each phase for a period following a command charge signal pulse in order to determine for each phase not only when it crosses zero, but also to determine its polarity.

Another feature of the invention is that when a transformer is used in the resonant charger with a full-wave rectifier, half cycles of alternate polarity are selected from the different power phases by using a control means which responds to a pulse of the command charge signal and to a signal stored indicative of the polarity of the last phase selected. This enables selection of the next full half cycle at a zero crossover of any phase of the AC power available having an opposite polarity.

The power source of a phase which next crosses zero of the correct polarity following a command charge signal pulse is selected by the control means to turn on one of the self-extinguishing switch means during the monitoring period following a command charge signal pulse. The control means includes means for storing the polarity of the last phase selected and logic means responsive to the storage means and the zero-crossover detection means for making the selection of an appropriate one of the unidirectional switching means for the next full half cycle.

The novel features of the invention are set forth with particularity in the appended claims. The invention will best be understood from the following description when read in conjunction with the accompanying drawings.

DESCRIPTION OF PREFERRED EMBODIMENTS

Figure 1:
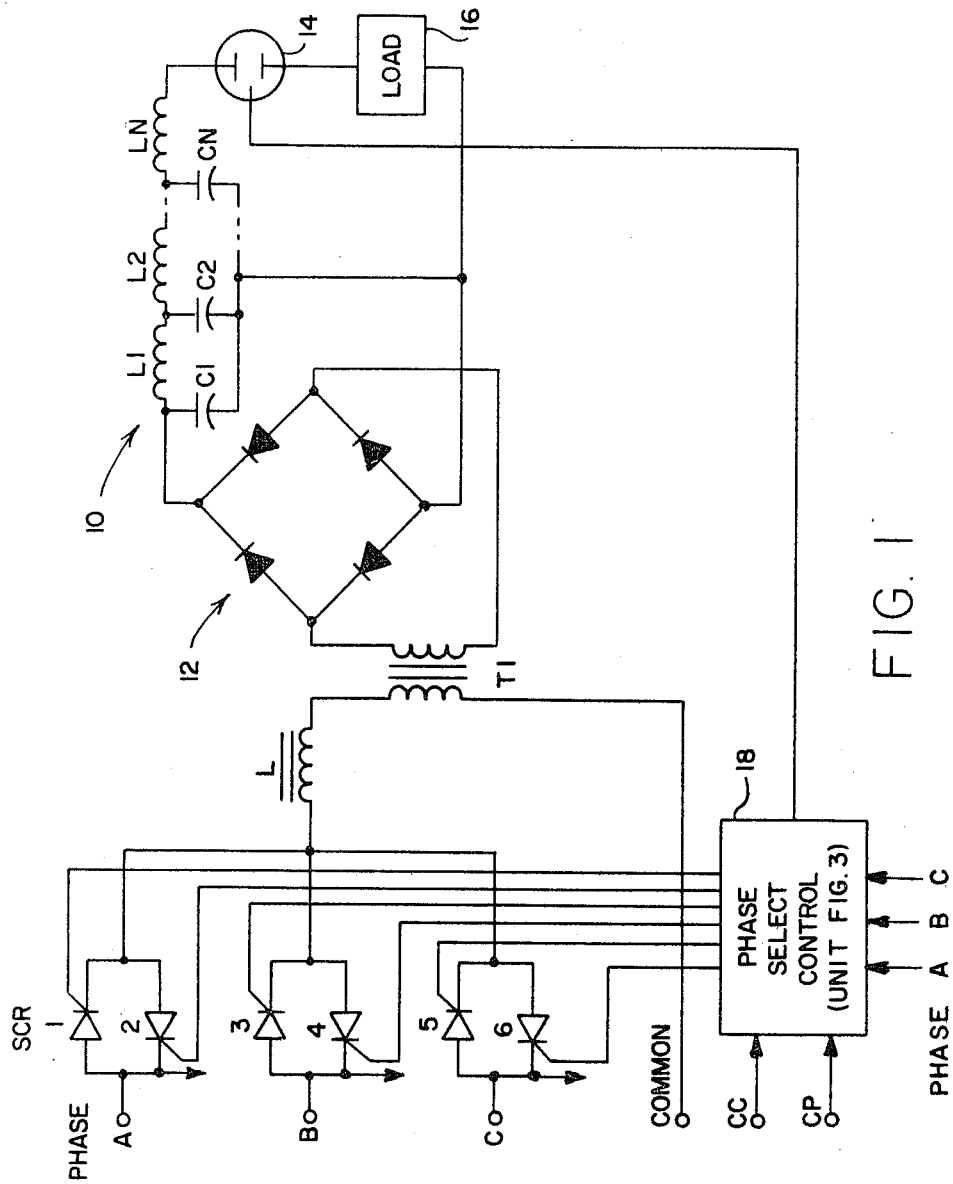
FIG. 1 is a diagram illustrating the organization of the present invention.

Referring now to FIG. 1 of the drawings, means for AC resonant charging of a pulse forming network (PFN) 10 is comprised of an inductance L in series with the primary winding of a step-up transformer T1. The secondary winding of the transformer is coupled to the PFN (a capacitive load) through a full-wave rectifier 12. A switch 14, which may be a triggered spark gap as shown, connects the PFN to a load 16, such as a laser cavity. A 3-phase, 4-wire AC source is connected to the inductance L through thyristor switches, such as silicon control rectifiers (SCR's) 1, 2, 3, 4, 5 and 6, using two SCR's for each of the three phases A, B and C in order to select the next full positive or negative half cycle of the AC power source to charge the PFN in response to a command charge (CC) signal pulse applied to a phase select control unit 18 which will be described more fully hereinafter with reference to FIG. 3. The resonance charging means then charges the PFN to a peak voltage equal to $\pi/2$ the amplitude of the stepped up AC source. Following that, a command pulse (CP)

signal pulse applied to the select control unit 18 closes the switch 14 to discharge the PFN through the load 16.

The object of the circuit shown in FIG. 1 is to furnish electrical pulses to the load 16 which, as noted hereinbefore, could be resistive, although the circuit was developed to power a laser cavity. The PFN may be any network that looks capacitive while being charged, although for this laser cavity development, the PFN was as shown in FIG. 1. Because the PFN inductors L1, L2 . . . LN have a very low reactance at the charge frequency, they can be neglected and the capacitors C1, C2 . . . CN of the PFN can then be considered as a single capacitor charged through the full-wave rectifier 12.

For AC resonant charging to take place, an inductor and capacitor should form a series resonant load at the power frequency. If there is no resistance and the load is switched on at 0 degrees, the capacitor should reach its full charge at 180 degrees. The peak charge voltage will be $\pi/2$ times the peak of the AC input voltage. The circuit shown in FIG. 1 works in this manner, except that the voltage is stepped up by the transformer T1 to increase the peak charge voltage. The size and weight of that transformer can be minimized by charging first with a current of one polarity on the primary winding and then with current of the opposite polarity, so the flux of the transformer core will not continue in the direction of the previous charge and cause saturation of the core. Since charging with a full half cycle is desirable, the phase select control unit 18 is arranged to always select a full half cycle of a polarity opposite the full half cycle selected for the last charge out of a three-phase power supply. Thus, if one charge has been achieved with a positive half cycle on the primary winding, the next charge is accomplished with a negative half cycle on the primary winding, and so forth. The next correct phase signal that is available from the power source after a charge command signal pulse is received by the phase select control unit 18 is the one that will be chosen. Consequently, for each command charge only one SCR switch is turned on just as soon as the zero-crossover of its respective phase power line is detected. After the PFN reaches full voltage, the SCR switch will extinguish itself automatically because the current drops to zero and the AC voltage reverses. For the next command charge, the phase select control unit then determines which of the SCR switches will be turned on next in order that the transformer T1 receive a full half cycle of the power source of a polarity opposite to the last one received.

Figure 2:
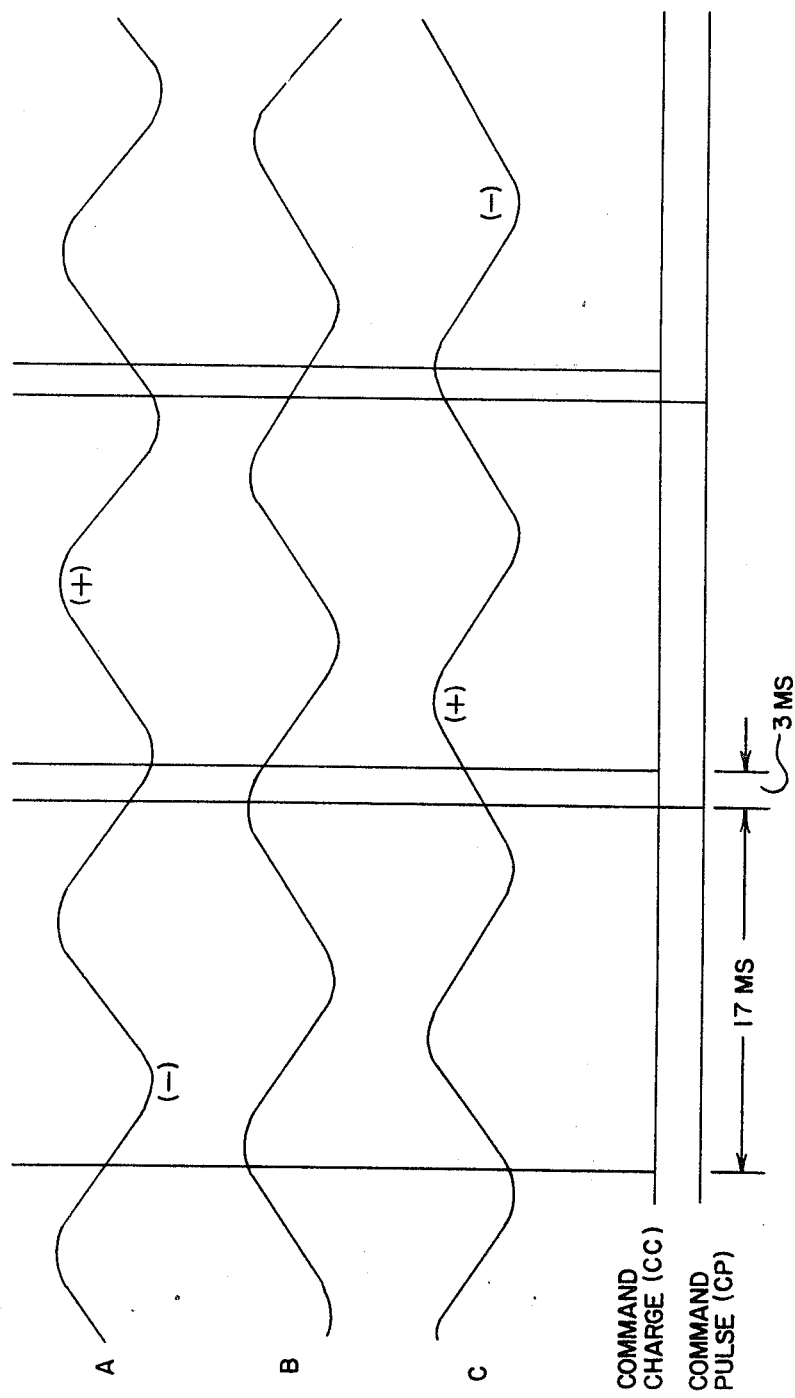
FIG. 2 is a waveform diagram illustrating the principals of the present invention.

The inductor that resonates with the PFN capacitance is connected in series with the primary winding of the transformer. The relationship for resonance is thus changed only by the turns ratio of the transformer T1. The resonance frequency is then $(2\pi \sqrt{LC})^{-1}$. Typically, if the input power is 60 Hertz, it will take 8.33 milliseconds or less for such an AC resonant charger to charge the PFN. Then the discharge switch 14 may be closed and the electrical energy stored in the PFN transferred to the load 16. Discharge through the load is normally accomplished in 20 microseconds, or less, so that for the input power at 60 Hertz, the timing relationship for three-phase AC power shown in FIG. 2 is feasible. The interval of 17 milliseconds is chosen to insure that there is always an available full half cycle of the correct polarity to charge the PFN before the discharge switch 14 is triggered. That is a function of the power source frequency. The system upper frequency limit is thus primarily a function of the AC power source frequency, but it is somewhat further limited by the discharge switch recovery time, which for a triggered spark gap switch is 3 milliseconds. If a faster switch is used, the upper limit of the pulse repetition rate can be higher than 50 pps. For example, if the switch requires only 100 microseconds to recover then the upper frequency limit will be 58.48 pps for a power source operating at a frequency of 60 Hertz.

This technique of charging the PFN through a full-wave rectifier with both positive and negative half cycles of the power source permits a greater pulse repetition rate, particularly when three-phase power is employed as shown in FIG. 2. The full-wave rectifier inverts the negative half cycles to positive half cycles so that the PFN is always charged with the same polarity.

The AC resonant-type PFN charging circuit shown in FIG. 1 is capable of charging at any selected rate from 0 to about 50 pps from a constant 60 Hertz power source (or from 0 to about 85% of any rate even for a source of higher frequency, such as 400 Hertz). It does this by selecting one half cycle of a sine wave of the 60 Hertz source each time the PFN is charged. This is illustrated in FIG. 2 which shows the three phases of the power source and the pulse timing of command charge (CC) and command pulse (CP) signals. The first CC pulse, which may occur at any time unsynchronized with the power source, sets the phase select control unit 18 to enable it to monitor the three phases of the power source for the first available full half cycle of the correct polarity to charge the PFN.

For example, assume the PFN has just been charged with a negative half cycle indicated by a negative sign in FIG. 2. Under those circumstances, SCR 2 (FIG. 1) is triggered to connect phase A to inductor L. Seventeen milliseconds later, the command pulse signal shown in FIG. 2 sets the phase select control unit to turn on the discharge switch 14. That discharges the PFN as noted hereinbefore. For the next charge cycle, the phase select control unit will monitor for the first available positive half cycle following the CC pulse which is received shortly after the CP pulse. Note in this example that this second CC pulse in FIG. 2 just misses the beginning of the positive half cycle of phase C. The next full positive half cycle is then found in phase A. When the sine wave of phase A crosses zero, SCR 1 is triggered to connect phase A to the inductor L. The next CP pulse than discharges the PFN, and shortly thereafter another CC pulse sets the select control unit 18 to monitor for the next full half cycle of the power source. Since the last half cycle selected for charging the PFN was positive, the next full half cycle to be selected must be negative. It can be seen in FIG. 2 that the next available negative half cycle is in phase C.

This timing of 17 milliseconds between a CC pulse and a CP pulse, and 3 milliseconds before the next CC pulse, allows for a maximum pulse repetition rate of 50 pps for a 60 Hertz power source. Operation is essentially the same at lower pulse repetition rates from 0 to 50 pps. All that is required to select any pulse repetition rate is control of the command charge and command pulse signals. As noted hereinbefore, the concept is not limited to a 60 Hertz power source and 0 to 50 pps; the concept may be used to equal advantage with a 400 Hertz power source at higher pulse repetition rates.

The phase select control unit 18 will now be described with reference to FIG. 3 and the timing diagram of FIG. 4. Noise filters 20a, 20b and 20c couple the three-phase power source lines to respective zero-crossover detectors 22a, 22b and 22c. Each crossover detector produces a positive pulse when the associated phase line crosses zero with a positive slope and a negative pulse when the phase line crosses zero with a negative slope, as shown by the three sets of waveform diagrams in FIG. 4 illustrating the phase A and its zero-crossover detector output, phase B and its zero-crossover detector output, and phase C and its zero-crossover detector output. The next waveform shown in FIG. 4 is a command charge signal which produces periodic pulses (CC) that may occur at any time, i.e., which are not synchronized with the power source.

A zero-crossover detector that is of the nature required in this system may be implemented in a number of different ways known to those skilled in the art. One way is to couple the phase signals to the zero-crossover detectors, such as through a voltage dividing network, and then amplify the signals at the inputs of the detectors using saturating operational amplifiers. The sine waves are thus converted into square waves. A separate differentiating network at the output of each detector then produces a positive pulse at the positive transitions of the square wave, thereby to signal a zero crossover into a positive half cycle. Similarly, each detector produces a negative pulse at the negative transition of the square wave, thereby to signal a zero crossover into a negative half cycle. The positive and negative pulses are then separated into two lines using a diode to couple the positive pulse output of the differentiating network to a second line.

Each command charge pulse triggers a monostable multivibrator (one shot) 24 to stretch the command charge pulse at its input into a monitoring pulse at its output of 11 milliseconds, as shown by a waveform MV24 in FIG. 4. This monitoring pulse enables AND gates G1 through G6. Gates G1, G3 and G5 receive the positive zero-crossover pulses from the respective zero-crossover detectors 22a, 22b and 22c, while the gates G2, G4 and G6 receive the negative zero-crossover pulses through respective inverters I2, I4 and I6. In that manner, both the positive and negative zero-crossover detector pulses presented to the gates G1 through G6 are positive, but the gates paired in sequence receive at each pair the positive and the negative zero-crossover pulses. Consequently, once the monitor pulse (MV24) enables the gates, the next zero-crossover pulse will be transmitted through one of the gates, but since it must be a gate associated with the zero crossover of polarity opposite the one last transmitted by a previous monitoring pulse, it is necessary to store in a bistable multivibrator (flip-flop) FF the polarity of the last zero crossover. That is accomplished by connecting the set (S) input terminal of the flip-flop to the output terminals of the gates G1, G3 and G5 associated with a positive zero crossover using an OR gate G7 and a delay element 26 of 3 milliseconds.

Setting the flip-flop will raise its Q output terminal to enable gates G2, G4 and G6 so that only a negative zero-crossover pulse will thereafter be transmitted to one of the SCR switches. The outputs of the gates G2, G4 and G6 are coupled to the reset (R) input terminal of the flip-flop by an OR gate G8 and a 3 millisecond delay element 28. In that manner, a negative zero-crossover pulse enables only a positive zero-crossover pulse to be selected during the next monitoring pulse following a command charge pulse, and a positive zero-crossover pulse again sets the flip-flop to raise its Q output terminal and enable the gates G2, G4 and G6 to select next only a negative zero crossover.

Each of the gates G1 through G6 is connected to its associated SCR switch through a respective one of a plurality of power amplifiers PA1 through PA6. When one SCR switch is turned on, the pulse forming network charges in an AC resonant manner from a three phase power line connected to the SCR switch. After the pulse forming network is discharged by a CP pulse transmitted through a gate G9, another SCR switch is selected to be turned on for recharging the pulse forming network which is then subsequently discharged, and so forth.

The gate G9 is enabled to transmit a CP pulse to an output amplifier 30 connected to the discharge switch 14 only during a 100 microsecond period centered on a CP pulse which occurs 17 milliseconds after a CC pulse. The enabling 100 microsecond pulse is generated by a CC pulse through a monostable multivibrator (one shot) 32 which stretches the CC pulse to a pulse of 17 milliseconds less 50 microseconds. The trailing edge of that stretched pulse then triggers a monostable multivibrator (one shot) 34 which produces a 100 microsecond pulse to enable the gate G9. In that manner, the gate G9 is inhibited from transmitting any pulse that may discharge the pulse forming network except at the time that a CP pulse is to occur following a CC pulse. This inhibit circuit thus requires that the command pulse signal be synchronized with the command charge signal.

Figure 3:
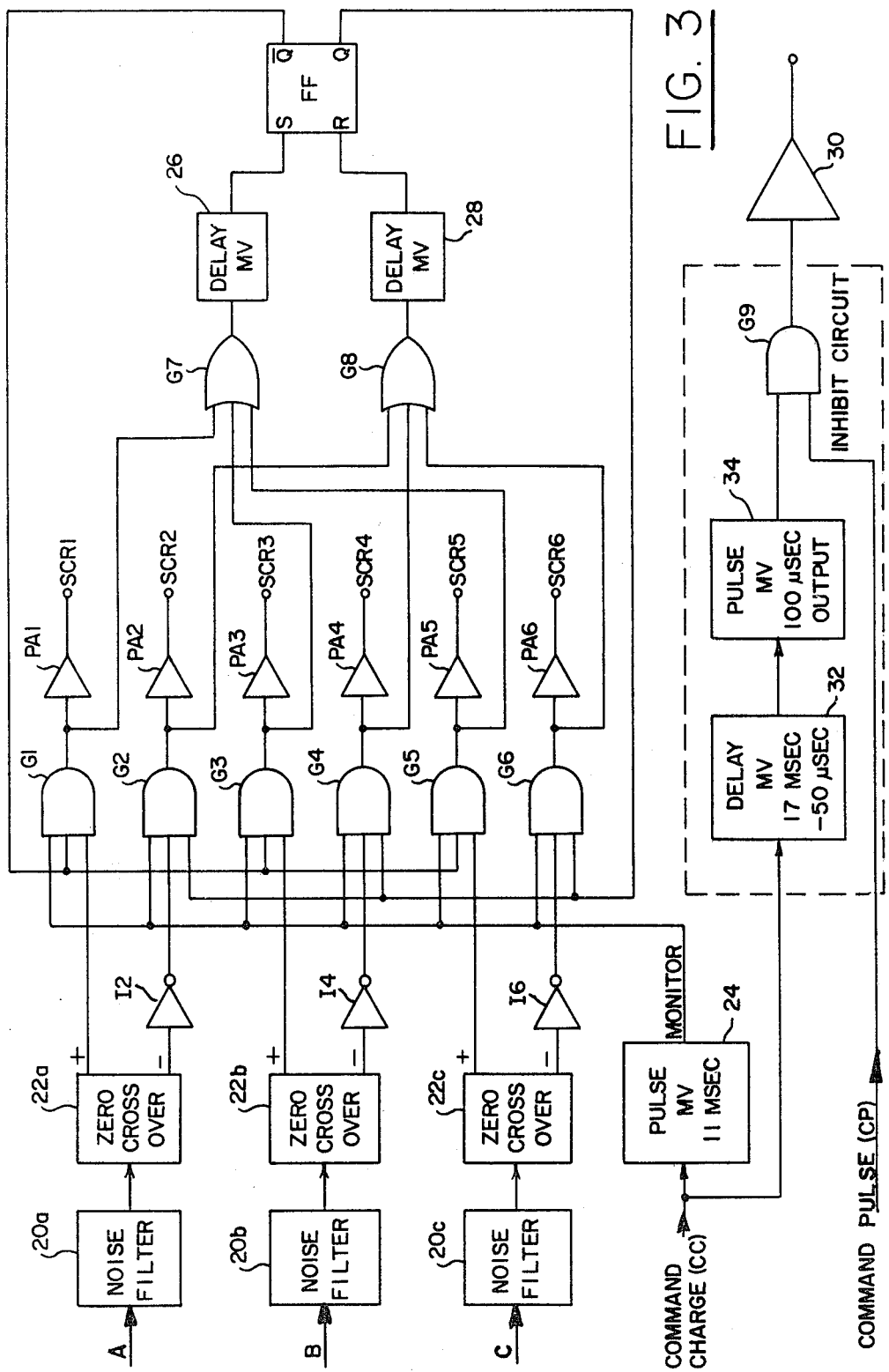
FIG. 3 is a logic diagram of a phase select control unit illustrated in FIG. 1.
Figure 4:
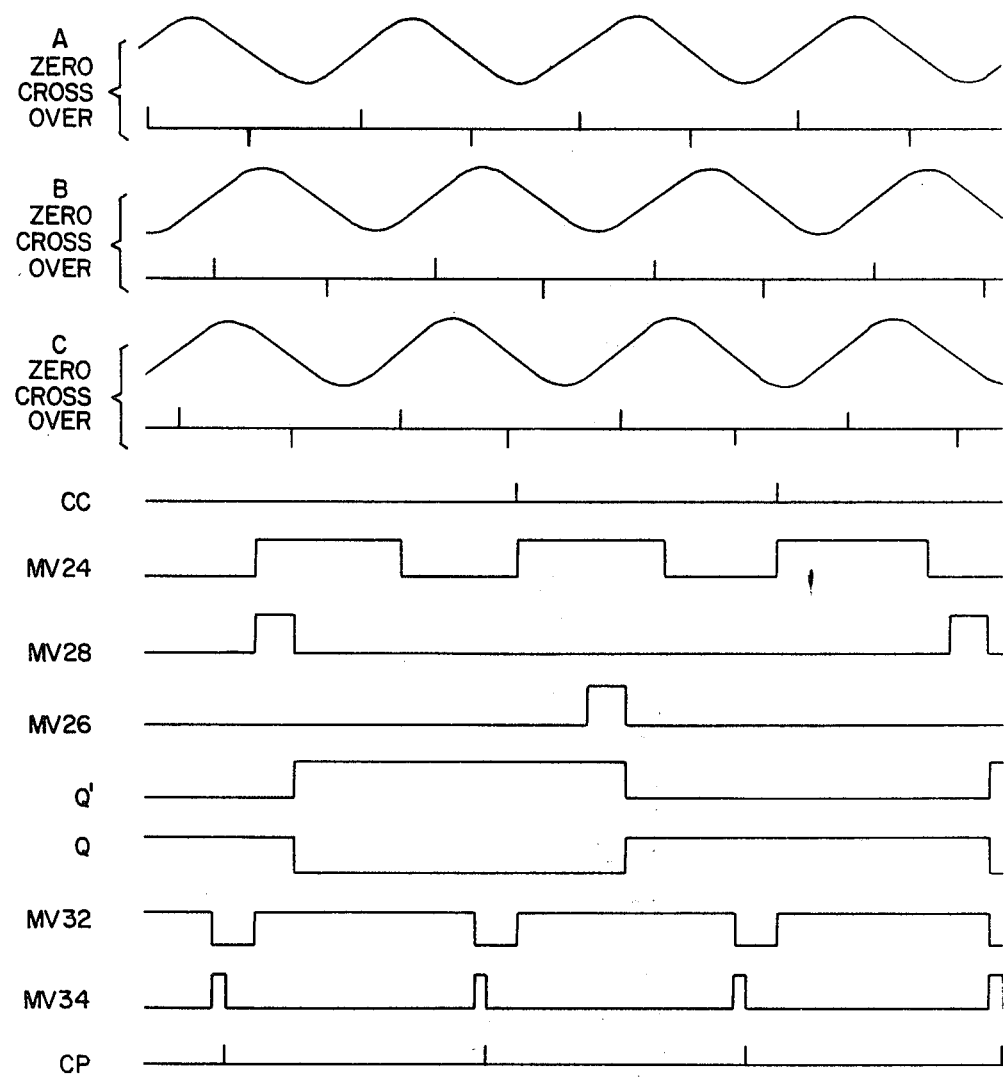
FIG. 4 is a timing diagram useful in understanding the operation of the control unit in FIG. 1.

In summary, the phase select control unit shown in FIG. 3 utilizes six AND gates to produce one SCR trigger signal for each charge cycle initiated by the command charge signal. The three functions needed to cause each AND gate to respond are a pulse indicating phase zero crossover and polarity, a CC pulse stretched into an 11 microsecond monitoring pulse, and a polarity selection signal from the flip-flop which indicates whether the transformer T1 needs a positive half cycle or a negative half cycle for the correct magnetic flux direction. The monitoring pulse enables all of the AND gates for 11 milliseconds to monitor all of the phases in search for the next zero crossover which, if of the right polarity as determined by the flip-flop, will be transmitted to trigger an appropriate SCR. If the next zero crossover detected is not of the proper polarity as determined by the flip-flop, none of the gates will transmit that zero-crossover pulse, and the monitoring process will continue until a zero-crossover pulse of the proper polarity is detected and transmitted to the appropriate SCR, and to the flip-flop to trigger it to its alternate state so that the following zero-crossover pulse detected will be of the opposite polarity. The polarity indicating voltage for the magnetic state of the transformer thus comes from the flip-flop. Consequently, during each charge period the flip-flop changes state to always select for the next charge period a zero crossover of opposite polarity. In that manner, each time the command charge signal triggers the monostable multivibrator 24, the phase select control unit shown in FIG. 3 selects the first available full half cycle of the correct polarity.

When power to the phase select control unit is turned off for any reason, charging of the PFN is terminated because none of the thyristors (SCR switches) will be triggered on. To resume charging the PFN, it is only necessary to turn on the phase select control unit. There is only a 50 percent probability that the flip-flop in that unit will be turned on in the proper state to correspond with the flux state of the transformer T1 which will remain while the control unit is turned off. If the flip-flop is turned on in the wrong state, a phase of the power source will be selected for the next charge of a polarity that will cause the transformer to saturate. When the transformer saturates, the first charge pulse on the secondary winding will be lower than normal in amplitude, and it will cause a higher than normal surge of current from the source in the primary winding during start. However, this will not cause any damage to the PFN or any other component of the system. It will simply result in insufficient energy in the first one or two pulses of energy from the PFN to the load.

To achieve the proper amount of energy with the first pulse after turning on the control unit, it would be necessary to provide a memory element to store the last state of the flip-flop before the control unit is turned off in order to cause the flip-flop to be turned on in that last state upon turning the control unit back on. To accomplish that, a latching relay may be added with a circuit that inhibits it from switching state while power is applied to the control unit. Once this power is removed, to turn the control unit off, the relay may then switch to one state or the other as dictated by the polarity of the voltage on the primary winding of the transformer T1 just before the power is turned off. The relay will stay in this state even though all power is off until the power is again turned on to the control unit.

Although particular embodiments of the invention have been described and illustrated herein, it is recognized that modifications and variations may readily occur to those skilled in the art. For example, although the invention was first conceived for pulser-type laser systems, industrial or military, it should be recognized that the invention may be used to equal advantage to charge any capacitive load at any rate less than the power frequency. Consequently, although the exemplary embodiment described herein is for a PFN that discharges pulses of energy into a laser cavity, it may be for a PFN that discharges pulses of energy into any resistive load, and in its broadest aspects, the invention may be for any resonant charge circuit for any load which requires recharging capacitance at a rate less than the power frequency. Consequently, it is intended that the claims be interpreted to cover such modifications and equivalents.

What is claimed is:

1. Apparatus for resonant charging of a capacitive load through a series inductance with a charge of selected polarity from a multiphase AC power source in response to command charge pulses at a variable repetition rate unrelated to and unsynchronized with the frequency of said source, comprising
   a plurality of separate self-extinguishing switching means for coupling each phase of said multiphase power source to said series inductance, each switching means being adapted to be normally nonconductive, and to be triggered on by a pulse for conduction until the power phase coupled by it reaches a level near zero just prior to crossing over to a half cycle of opposite polarity, and
   phase control means responsive to each command charge pulse for monitoring each of said power phases for a period greater than one half cycle of said power source, but less than a full cycle to determine only the next power phase of opposite polarity to cross zero, and at zero crossover of that phase, generating a trigger pulse for turning on the self-extinguishing switching means for a full half cycle coupling the phase then crossing zero to the capacitive load.

2. Apparatus as defined in claim 1 including a transformer and full-wave rectifier for coupling said plurality of switching means to said capacitive load with said inductance in series, said rectifier being connected between said transformer and said load, and wherein said phase control means monitors each of said power phases to determine the next power phase to cross zero to begin a full half cycle of either polarity for charging the load.

3. Apparatus as defined in claim 2 wherein said phase control means includes means for storing a signal in one of two states indicative of the polarity of the power phase selected for the last half cycle utilized for charging the capacitive load and means responsive to said polarity signal for causing the power phase to be selected to have a full half cycle of a polarity opposite of the last power phase selected, whereby said transformer receives full half cycles of alternate polarity for successive charging cycles called for by successive command charge pulses.

4. Apparatus as defined in claim 3 including a trigger switch for discharge control of the capacitive load in response to a discharge command pulse, and said phase control means includes means for inhibiting pulses from triggering said trigger switch except when discharge command pulses synchronized with said command charge pulses are present.

5. Apparatus as defined in claim 4 wherein said control means includes means for detecting both positive and negative zero-crossover detectors, and for generating a pulse on one line for a positive zero crossover, and a pulse on a separate line for a negative zero crossover, pulse stretching means for extending a command charge pulse for said period to be monitored for zero crossover, a pair of AND gates for each power phase, one gate connected to said one line to receive a positive zero crossover signal, said one gate enabled by said stored signal while it is in one of said two states indicative of a negative last half cycle, the other gate connected to said other line to receive a negative zero crossover signal, said other gate being enabled by said stored signal while it is in the other of said two states indicative of a positive last half cycle, and both enabled by said command charge pulse extended by said pulse stretching means, whereby said resonant charger receives full half cycles of said power source of alternate polarity in response to successive command charge pulses.

6. Apparatus for repeatedly charging a capacitive load with a charge of fixed polarity from a multi-phase power source at a controlled repetition rate in response to charge command pulses produced at a variable rate unrelated to the frequency of said power source, comprising
   means for resonant charging the capacitive load with said charge of predetermined polarity,
   a separate pair of unidirectional switch means in parallel coupling each phase of said power source to said resonant charging means, thereby to charge the load in response to a control trigger pulse, one of the two switch means being adapted to couple a positive half cycle of one phase of power to the resonant charging means, and the other of the two switch means being adapted to couple a negative half cycle of said one phase, each switch means responding to a control trigger pulse to conduct current of only one predetermined polarity when switched on until current amplitude of the half cycle for which it is switched on decreases to near zero at crossover to a half cycle of opposite polarity, and phase select means for selecting only the next full half cycle phase of opposite polarity beginning with a zero crossover following the occurrence of one of said charge command pulses, whereby the charge repetition rate may be varied from zero to some value not exceeding the power frequency.

7. The combination of claim 6 wherein said resonant charging means includes a transformer for coupling half-wave cycles of selected phases of said power source to said capacitive load, and a full-wave rectifier connected between the secondary winding of said transformer and the load, and wherein said phase select means includes means for storing a signal indicative of the polarity of the last half cycle selected for coupling to the capacitive load, separate means for determining the beginning of each half wave cycle following zero crossover of each phase of said source, and in response thereto emitting separate signals for each phase of said source at zero crossover indicative of the polarity of the full half cycle to follow, means responsive to each charge command signal for generating a monitoring signal for a period greater than a half wave cycle, but less than a full wave cycle of said source, and for each switch means of each pair of switch means, separate logic means responsive to the signal stored in said storage means, the monitoring signal, and a different one of the separate signals indicative of both the beginning and polarity of a half wave cycle of a phase of said source for selectively turning on an appropriate one of a pair of switch means in response to a command charge signal for charging the load through said transformer with the phase of the source that crosses zero next into a half cycle of a polarity opposite the last polarity used to charge the load.

8. Apparatus for repeatedly charging a capacitive load with a charge of fixed polarity from a multiphase AC source at a variable repetition rate in response to command charge pulses occurring at a rate unrelated to and unsynchronized with the frequency of said source, comprising resonant charging means including a transformer and full-wave rectifying means for charging the load with unidirectional current of predetermined polarity, separate self-extinguishing switching means for coupling each phase of said source to said charging means, each switching means being adapted to be normally nonconductive, and to be turned on by a control pulse for conduction during either half cycle of the phase of said source coupled by the switching means from the time it is triggered on until the phase reaches a level near zero crossover, and means for generating separate control pulses for said switching means coupling the phases of said source to said charging means to turn on the one switching means associated with the next phase of opposite polarity which crosses zero following a command charge pulse.

9. Apparatus as defined in claim 8 wherein said means for generating separate control pulses for said switching means includes means for storing a signal indicating the polarity of the phase selected for each full half cycle conducted by switching means for charging the capacitive load, and means responsive to said storing means for selecting for the next full half cycle a polarity opposite the last full half cycle selected as indicated by the signal stored in said storage means.

10. Apparatus as defined in claim 9 wherein said self-extinguishing switching means for each phase is comprised of a pair of silicon-controlled rectifiers connected in parallel with opposite polarity, one for conducting positive half cycles, and one for conducting negative half cycles.

* * * * *